No. 770,848. PATENTED SEPT. 27, 1904.
N. W. GALES.
CENTRIFUGAL CREAM SEPARATOR.
APPLICATION FILED OCT. 4, 1900.
NO MODEL. 2 SHEETS—SHEET 1.
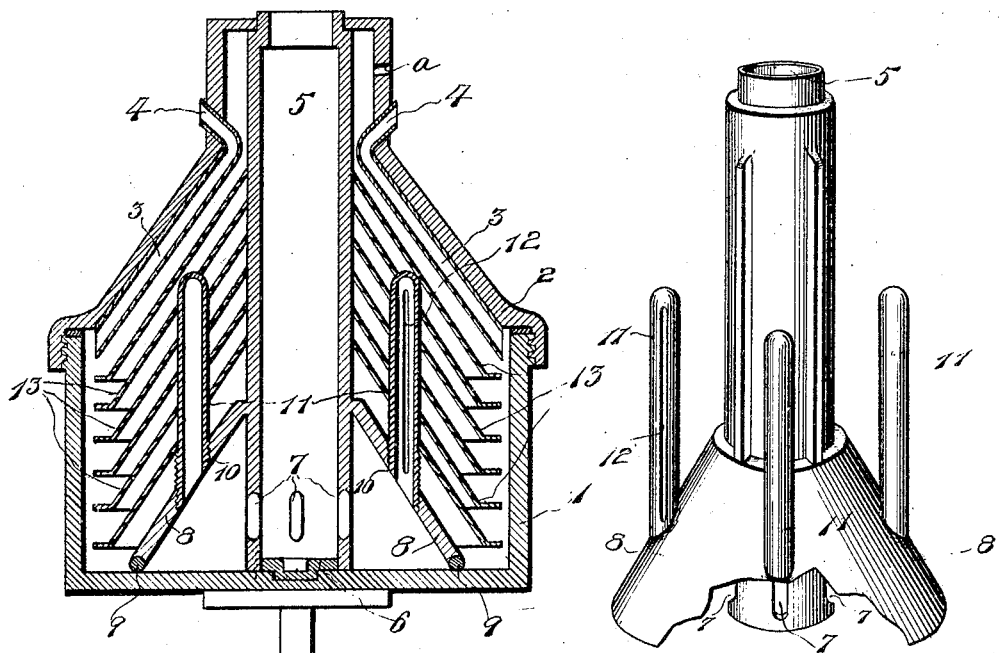
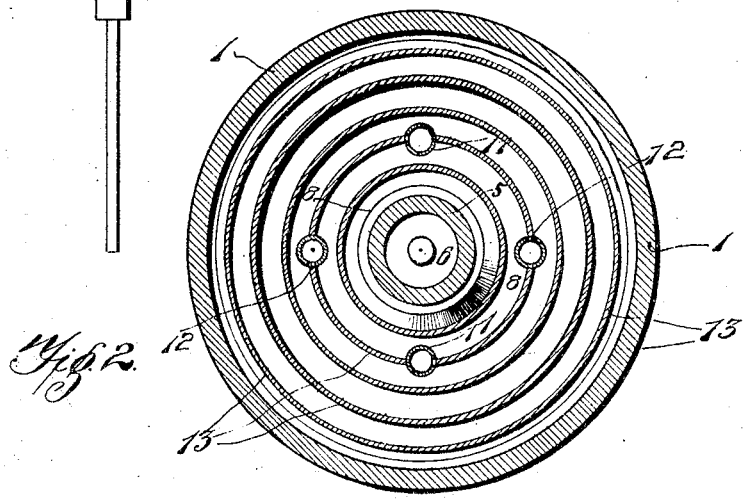

No. 770,848. PATENTED SEPT. 27, 1904.
N. W. GALES.
CENTRIFUGAL CREAM SEPARATOR.
APPLICATION FILED OCT. 4, 1900.
NO MODEL. 2 SHEETS—SHEET 2.
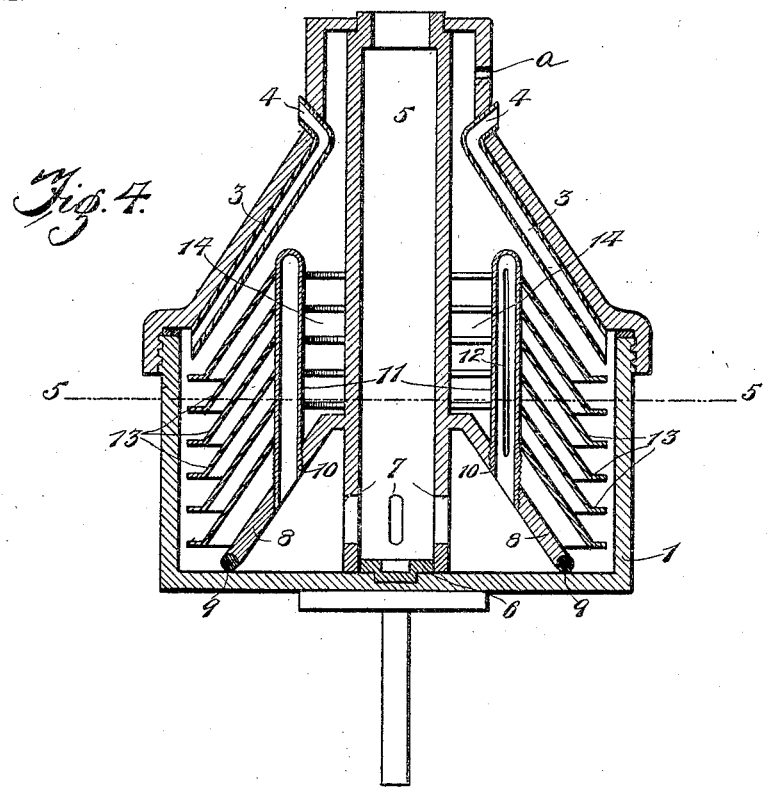
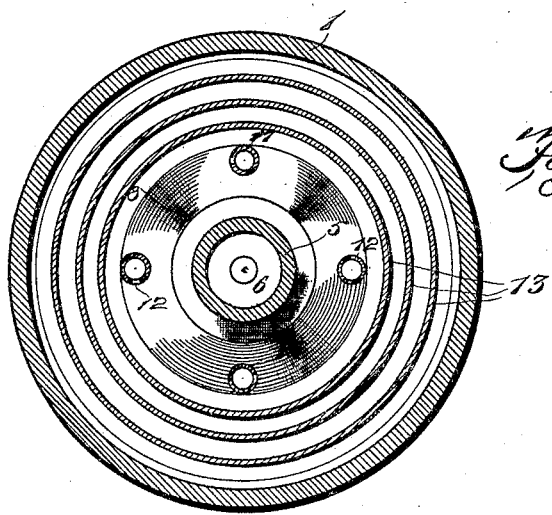

No. 770,848. Patented September 27, 1904.

UNITED STATES PATENT OFFICE.

NICHOLAS W. GALES, OF WATERLOO, IOWA.

CENTRIFUGAL CREAM-SEPARATOR.

SPECIFICATION forming part of Letters Patent No. 770,848, dated September 27, 1904.

Application filed October 4, 1900. Serial No. 32,019. (No model.)

*To all whom it may concern:*

Be it known that I, NICHOLAS W. GALES, a citizen of the United States, residing at Waterloo, in the county of Blackhawk and State of Iowa, have invented a new and useful Centrifugal Cream-Separator, of which the following is a specification.

This invention relates to cream-separators, and has for its object to provide an improved centrifugal separator in which the parts thereof are arranged for being conveniently and effectively cleansed and for separating the maximum amount of cream within a minimum time. It is furthermore designed to discharge the milk to the separating-partitions in a new and improved manner, so as to obtain the maximum separating effect thereof and to prevent the milk from being immediately discharged to the peripheral edges of the partitions, whereby the cream is held at the center of the separator and particles thereof are prevented from escaping with the skimmed milk before being acted upon by the separating-partitions.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical central longitudinal sectional view of a separator constructed and arranged in accordance with the present invention. Fig. 2 is a transverse sectional view taken on the line 2 2 of Fig. 1. Fig. 3 is a detail perspective view of the distributer and inlet-tube, parts being broken away to show the bottom of the inlet-tube. Fig. 4 is a view similar to Fig. 1 and shows a modified form of the device. Fig. 5 is a sectional view on the line 5 5 of Fig. 4.

Corresponding parts are designated by like characters of reference in all of the figures of the drawings.

Referring to the drawings, 1 designates an ordinary bowl having the substantially conical removable cover 2, which carries upon its inner side a plurality of discharge-tubes 3, that discharge outwardly through the upper portion of the cover, as indicated at 4. These tubes are for the discharge of the skimmed milk, as usual. A lateral discharge-opening *a* is formed through the upper portion of one side of the cover 2 and located above the outlets for the skimmed milk and designed for the outlet of the cream.

Located within the bowl and extending through the longitudinal axis thereof is the milk-inlet tube 5, the upper end of which is open and extends through the top of the cover. The lower end of the tube is also open and rests upon the bottom of the bowl, the latter having a central boss or raised portion 6, which fits snugly within the lower open end of the tube, so as to hold the latter in place. The lower portions of the sides of the tube are provided with a plurality of discharge openings or perforations 7, that discharge into the interior of the conical distributer 8, which is in the form of a downwardly and outwardly flared marginal flange, having its upper end connected to the tube at a point above the discharge-openings 7 and its lower marginal edge terminating substantially in the same plane with the bottom edge of the inlet-tube, so as to rest upon the bottom of the bowl, whereby the bottom of the distributer is closed. A suitable packing-ring 9 is interposed between the bottom edge of the conical distributer and the bottom of the bowl, so as to prevent the escape of milk through the joint between the distributer and the bottom of the bowl. The conical flange or distributer is provided with a plurality of screw-threaded openings 10, arranged in substantially the same horizontal plane, and are designed for the reception of the screw-threaded lower ends of the distributer-tubes 11. These tubes are open at their lower ends, so as to communicate with the interior of the distributer, and have their upper ends closed. Each tube is also provided with a longitudinal slit or slot 12, which extends for the entire length of the tube and is designed for the discharge of the milk. Also this discharge-opening is disposed at substantially right angles to the radial axis of the inlet-tube 5 and in the rear side of the tube with respect to the rotary motion of the bowl, so that the discharge of milk is tangential instead of radial, as heretofore, whereby the distance from the discharge-opening to the wall of the bowl in the direction of the discharge is greater than in a radial discharge, and therefore the cream has more time to become separated before the skimmed milk reaches the marginal edge or wall of the bowl. A plurality of superposed conical separating disks or partitions 13 embrace the inlet-tube and are also provided with openings for the reception of the discharge-tubes and are separated at suitable distances in the common or ordinary manner.

In the operation of the device the milk is introduced into the top of the inlet-tube, from which it passes to the conical distributer through the openings 7 in the bottom of the tube, thence it rises through the discharge-tubes, and finally discharges tangentially through the discharge-openings of the tubes. It will now be observed that the tubes are located in the neutral zone, between the cream zone at the center of the bowl and the skimmed-milk zone at the side walls of the bowl, so that the milk is discharged between the extreme zones and in a tangential direction, thereby striking the several separating disks or partitions intermediate of their inner and outer marginal edges, whereby the cream is effectually separated. Also the milk is acted upon by the separating-disks before it or any part of it reaches the outer marginal edges of the disks, whereby all parts of the milk are treated alike and none of the parts escape from the separating action of the disks. This is an important advantage over prior separators, as the usual discharge of the milk is radial, whereby the milk is thrown directly toward the outer marginal edges of the disks, and hence some of the unseparated milk escapes the disks and passes off with the skimmed milk. It will thus be apparent that the present arrangement of discharge-openings results in a more thorough and efficient separation of the cream, as none of the milk escapes the action of the separating-disks.

Heretofore separating-partitions have been disposed across radial discharges, thereby breaking up the liquid into substantially tangential streams, and also the liquid has been discharged at an angle to the radius of the device, but without partitions lying across the discharge, whereby the liquid is free to fly substantially radially outwardly as soon as discharged. In contradistinction to these methods the present invention is designed to discharge the liquid tangentially, so that the whole milk may lie close to the cream zone when first discharged, and then to split up the discharged milk into outwardly-directed substantially radial streams of heavy milk and inwardly-directed substantially radial streams of light milk or cream, this action being brought about by locating the division contrivance across the several tangential discharges, so that the direction of impact of the milk is substantially at right angles to the radius of the device. Moreover, the lower end of the inlet-tube is open and unobstructed when removed from the bowl, so as to facilitate the cleansing thereof, and the bottom of the conical distributer is also open and unobstructed, so as to give access to the interior of the discharge-tubes through the bottoms thereof for the purpose of cleansing them.

In the modified form of the device as shown in Figs. 4 and 5 the arrangement of parts is exactly the same as described hereinbefore, the only change being in forming the central openings of the conical separating plates or partitions larger, so that the walls of said openings may snugly embrace the outer sides of the discharge-tubes 11 only, thereby providing an unobstructed cream-space 14 about the exterior of the inlet-tube 5, the inner sides of the discharge-tubes, and the inner margins of the several conical separating-plates. It will be understood that in both forms the discharge-tubes are located in the dividing-line between the cream space or zone and the neutral zone. By this arrangement the separating-partitions do not extend into the cream zone, so that the maximum cream zone is provided without reducing the other zones, and thus the capacity of the separator is materially increased.

In both forms of the machine the superposed plates form a division contrivance extending from near the periphery of the bowl toward the axis thereof and intersecting both the radial horizontal and radial vertical lines of the bowl, while the discharge-tubes 11 form inlet devices opening between adjacent plates of the division contrivance and also between the inner and outer extremities of the same, and the tangentially-disposed slots of the tubes form means for directing the discharge from the inlet devices at an angle with the radius of the bowl. Moreover, the walls of the inlet-tube 5 form positive imperforate partitions between the cream zone and the passage for the incoming whole milk, whereby intermingling of the whole milk with the cream is effectually prevented.

What is claimed is—

1. In a centrifugal cream-separator, the combination with a bowl, having a central boss or raised portion upon the inner side of the bottom thereof, of a removable central axial inlet-tube having an open lower end, which rests upon the bottom of the bowl and embraces the boss or raised portion, and also provided with lateral discharge-openings, a conical distributer embracing and carried by the inlet-tube, and also having an open and unobstructed bottom, the marginal edge of which rests upon the bottom of the bowl, distributer-tubes rising from the conical distributer and opening into the interior thereof, and removable superposed conical separating devices embracing the inlet and distributer tubes.

2. An inlet and distributer device for centrifugal cream-separators, comprising an inlet-tube, which is open at its opposite ends and also provided with lateral discharge-openings near its lower end, a conical distributer-flange embracing the inlet-tube above the discharge-openings, flaring outwardly and downwardly, and having its lower marginal edge in substantially the same plane with that of the bottom edge of the tube, the bottom of the distributer being open and unobstructed, and a plurality of distributer-tubes rising from the distributer, the tops of the tubes being closed, and their bottoms open and communicating with the interior of the distributer, each tube having a longitudinal slot extending for the entire length thereof.

3. A centrifugal cream-separator, comprising a bowl, an axial inlet-tube, having an enlarged distributer at its lower end, discharge-tubes rising from the distributer, located between the cream zone and the neutral zone, and having discharge-openings discharging at substantially right angles to the radial axis of the inlet-tube, and superposed conical separating partitions or plates, having central openings embracing the combined discharge-tubes, and forming an unobstructed central cream zone.

In testimony that I claim the foregoing as my own I have hereto affixed my signature in the presence of two witnesses.

NICHOLAS W. GALES.

Witnesses:
D. W. JORDAN,
J. L. PINT.